United States Patent
Chatterji et al.

(10) Patent No.: US 10,907,085 B2
(45) Date of Patent: Feb. 2, 2021

(54) SWELLABLE GLASS PARTICLES FOR REDUCING FLUID FLOW IN SUBTERRANEAN FORMATIONS

(71) Applicant: Halliburton Energy Services, Inc., Houston, TX (US)

(72) Inventors: Jiten Chatterji, Duncan, OK (US); Gregory Robert Hundt, Spring, TX (US); Thomas Singh Sodhi, Humble, TX (US); Darrell Chad Brenneis, Marlow, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 135 days.

(21) Appl. No.: 15/580,207

(22) PCT Filed: Jul. 8, 2015

(86) PCT No.: PCT/US2015/039591
§ 371 (c)(1),
(2) Date: Dec. 6, 2017

(87) PCT Pub. No.: WO2017/007472
PCT Pub. Date: Jan. 12, 2017

(65) Prior Publication Data
US 2018/0155605 A1    Jun. 7, 2018

(51) Int. Cl.
| | | |
|---|---|---|
| *E21B 21/00* | (2006.01) | |
| *C09K 8/487* | (2006.01) | |
| *C09K 8/493* | (2006.01) | |
| *C04B 26/12* | (2006.01) | |
| *C04B 26/06* | (2006.01) | |
| *C04B 26/16* | (2006.01) | |
| *C04B 26/14* | (2006.01) | |
| *C04B 26/18* | (2006.01) | |

(Continued)

(52) U.S. Cl.
CPC .............. *C09K 8/487* (2013.01); *C04B 26/06* (2013.01); *C04B 26/12* (2013.01); *C04B 26/14* (2013.01); *C04B 26/16* (2013.01); *C04B 26/18* (2013.01); *C09K 8/493* (2013.01); *C09K 8/508* (2013.01); *C09K 8/516* (2013.01); *E21B 21/003* (2013.01); *C09K 2208/10* (2013.01)

(58) Field of Classification Search
CPC .............................. C09K 8/487; E21B 21/003
USPC ......................................................... 166/295
See application file for complete search history.

(56) References Cited

U.S. PATENT DOCUMENTS 4,168,257 A    9/1979 Meijs
6,508,306 B1    1/2003 Reddy et al.
(Continued)

OTHER PUBLICATIONS

International Search Report and Written Opinion for PCT/US2015/039591 dated Mar. 2, 2016.

*Primary Examiner* — William D Hutton, Jr.
*Assistant Examiner* — Ashish K Varma
(74) *Attorney, Agent, or Firm* — Thomas Rooney; C. Tumey Law Group PLLC

(57) ABSTRACT

Methods, compositions, and systems that use swellable glass particles to reduce fluid flow in subterranean formations are included. An example method may comprise introducing swellable glass particles into a zone of a subterranean formation; contacting the swellable glass particles with a resin composition in the zone; and allowing the resin composition to harden in the zone whereby flow through the zone is reduced.

20 Claims, 3 Drawing Sheets

(51) Int. Cl.
   *C09K 8/508* (2006.01)
   *C09K 8/516* (2006.01)

(56) References Cited

U.S. PATENT DOCUMENTS

| | | | |
|---|---|---|---|
| 7,762,329 B1 * | 7/2010 | Morgan | C09K 8/506 |
| | | | 166/285 |
| 7,776,797 B2 | 8/2010 | Allin et al. | |
| 7,891,425 B2 | 2/2011 | Dalrymple et al. | |
| 8,132,623 B2 | 3/2012 | Allin et al. | |
| 9,120,962 B1 | 9/2015 | Chatterji et al. | |
| 2003/0230431 A1 * | 12/2003 | Reddy | C09K 8/12 |
| | | | 175/64 |
| 2009/0137431 A1 | 5/2009 | Reddy et al. | |
| 2009/0176667 A1 | 7/2009 | Nguyen | |
| 2010/0089581 A1 | 4/2010 | Nguyen et al. | |
| 2010/0186956 A1 | 7/2010 | Morgan et al. | |
| 2011/0220350 A1 | 9/2011 | Daccord et al. | |
| 2012/0048551 A1 * | 3/2012 | Allison | E21B 33/1208 |
| | | | 166/292 |
| 2014/0116711 A1 | 5/2014 | Tang | |

* cited by examiner

SWELLABLE GLASS PARTICLES FOR REDUCING FLUID FLOW IN SUBTERRANEAN FORMATIONS

BACKGROUND

Disclosed herein are wellbore operations and, more particularly, the use of the swellable glass particles to reduce fluid flow in subterranean formations.

A natural resource such as oil or gas residing in a subterranean formation can be recovered by drilling a wellbore into the formation. A wellbore is typically drilled while circulating a drilling fluid through the wellbore. Among other things, the circulating drilling fluid may lubricate the drill bit, carry drill cuttings to the surface, and balance the formation pressure exerted on the wellbore. One problem associated with drilling may be the undesirable loss of drilling fluid to the formation. Such lost fluids typically may go into, for example, pre-existing fractures, induced fractures, cracks, vugs, channels, or other openings through which fluid may be lost. This problem may be referred to as "lost circulation," and the sections of the formation into which the drilling fluid (or other fluid) may be lost may be referred to as "lost circulation zones." The loss of drilling fluid into the formation is undesirable, inter alia, because of the expense associated with the drilling fluid lost into the formation, loss of time, additional casing strings and, in extreme conditions, well abandonment. In addition to drilling fluids, problems with lost circulation may also be encountered with other fluids, for example, spacer fluids, completion fluids (e.g., completion brines), fracturing fluids, and cement compositions that may be introduced into a wellbore.

A number of techniques have been developed for combating lost circulation one of which involves the placement of lost circulation materials into the lost circulation zone. Conventional lost circulation materials may include fibrous, lamellated or granular materials. The lost circulation materials may be placed into the formation, inter alia, as part of a drilling fluid or as a separate lost circulation pill in an attempt to control and/or prevent lost circulation. Another technique that has been developed to control lost circulation involves the placement of a settable composition into the wellbore to seal the lost circulation zone. For a number of reasons, however, these techniques may not provide a desirable level of lost circulation control in all circumstances.

BRIEF DESCRIPTION OF THE DRAWINGS

These drawings illustrate certain aspects of some of the embodiments of the present method, and should not be used to limit or define the method.

DETAILED DESCRIPTION

Figure 1:
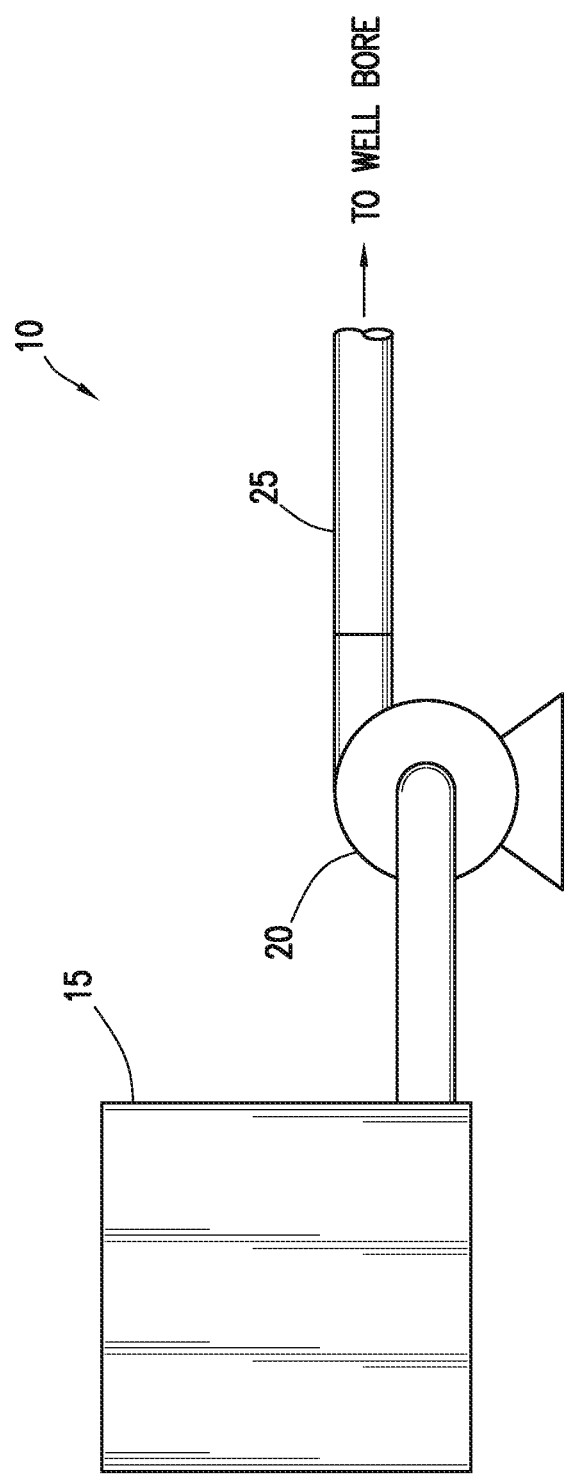
FIG. 1 is a schematic illustration of an example fluid handling system.

Disclosed herein are wellbore operations and, more particularly, the use of the swellable glass particles to reduce fluid flow in subterranean formations. The swellable glass particles may be particularly suitable for addressing a number of problems in subterranean formations, including without limitation lost circulation. The swellable glass particles disclosed herein may be referred to as "swellable" because they swell (i.e., increase in volume) when in contact with organic fluids, for example, resins. The amount of swelling that may be induced in the swellable glass particles are a property determined by the specific swellable glass particles used, the specific organic liquid that contacts the swellable glass particles, the amount of organic liquid that contacts the swellable glass particles, and the duration of the contact the organic liquid makes with the swellable glass particles.

Because the swellable glass particles are swellable in organic fluids, the swellable glass particles may be used in combination with resins to reduce or potentially even prevent flow of fluids in subterranean formations. Advantageously, the swellable glass particles and resin composition may be used to create a fluid flow preventing barrier. The fluid flow preventing barrier may be formed in the subterranean formation to block certain flow paths in the subterranean formation, reducing the flow of fluids through the subterranean formation. Examples of the types of flow paths that may be blocked by the fluid flow preventing barrier include, but are not limited to, perforations, such as those formed by a perforation gun, fissures, cracks, fractures, streaks, flow channels, voids, high permeable streaks, annular voids, or combinations thereof, as well as any other zone in the formation through which fluids may undesirably flow.

The swellable glass particles may be used with the resin composition in a variety of subterranean operations, where formation of diverting (or flow preventing) barriers may be desired. The sealant composition may be used prior to, during, or subsequent to a variety of subterranean operations. By way of example, a lost circulation zone may be identified during a drilling, cementing, or other subterranean operation, requiring cessation of downhole activities for remedial operations. To alleviate the problems with lost circulation, the swellable glass additives may be introduced into the subterranean formation and contacted by a resin composition. The swellable glass additives may swell when contacted by the resin composition while the resin composition may set to form a hardened mass. Without being limiting by theory, it is believed that the swellable glass particles, retain the resin composition near the wellbore, reducing flow of the resin composition out into the subterranean formation. The combination of the swellable glass additives and the set resin may form a barrier that blocks flow, allowing the drilling, cementing, or other operations to resume in the wellbore. For example, the swellable glass particles with the resin composition may be used to prevent the loss of fluids (e.g., drilling fluids, cement compositions, or other well treatment fluids) into lost circulation zones, which may contain fractures (natural or pre-existing), cracks, vugs, channels and other openings into which fluid may be lost.

A wide variety of swellable glass particles may be employed that swell upon contact with a resin. The swellable glass particles may be used in the methods disclosed herein to aid in reducing flow in a subterranean formation. For example, the swellable glass particles, when exposed to a sufficient amount of resin may swell to a volume several times larger than the volume of the swellable glass particles before such exposure.

A non-limiting example of suitable swellable glass particles may comprise a plurality of interconnected organosilica nanoparticles. Generally these type of swellable glass particles may be described as a plurality of interconnected organosilica nanoparticles. More particularly, the swellable glass particles may include bridged organosiloxane sol-gels comprising a plurality of alkylsiloxy substituents. Without being limited by theory, these interconnected organosilica nanoparticles may generally be produced by a process that includes taking a bridged organosiloxane sol-gel comprising residual silanols and then derivatizing the residual silanols of the sol-gel with a reagent having at least one group that is reactive with the residual silanols and also at least one alkyl group. More specifically, preparation of the sol-gel may generally include forming the interconnected organosilica nanoparticles from bridged silane precursor molecules through polymerization using an acid or base catalyst. After gelation, the sol-gel may be aged sufficiently to undergo syneresis. At this point, the sol-gel may be derivatized as described above to end-cap the silanol-terminated polymers present on the sol-gel. Typical derivatization reagents may include, but are not limited to, halosilanes, silazanes, disilazanes, and the like. The derivatized sol-gel may then be dried, and/or ground into a fine powder, for use as a swellable glass particle. A commercially available example of a swellable glass particle is OSORB® swellable glass, available from ABSMaterials, Inc. of Wooster, Ohio.

The swellable glass particles are swellable upon contact with organic liquids, such as resins. The amount of swelling that may be induced in the swellable glass particles are a property determined by the specific swellable glass particles used, the specific organic liquid that contacts the swellable glass particles, the amount of organic liquid the contacts the swellable glass particles, and the duration of the contact the organic liquid makes with the swellable glass particles. The swellable glass particles may swell to a volume greater than about 1.5 times to about 10 times or more the dried volume of the swellable glass particles. By way of example, the swellable glass particles may swell to a volume of about 2 times, about 3 times, about 5 times, about 7 times, about 10 times, or more the dried volume of the swellable glass particles. As discussed above, the swellable glass particle may swell upon contact with resins.

The swellable glass particles generally may be in particulate form for use as a dry powder. As used herein, the term "particulate" refers to materials in solid state having a well-defined physical shape as well as those with irregular geometries, including any particulates having the physical shape of platelets, shavings, fibers, flakes, ribbons, rods, strips, spheroids, hollow beads, toroids, pellets, tablets, or any other physical shape. The swellable glass particles may be ground through any sufficient process to achieve a suitable size. The powdered form of the swellable glass particles may have a particle size, without limitation, in the range of between about 1 micron to about 500 microns, about 10 microns to about 350 microns, or about 50 microns to about 250 microns. However, particle sizes outside this disclosed range may also be suitable for particular applications. The swellable glass particles also may be dried for mixing with a carrier fluid and for ease of transport. Without limitation, the swellable glass particles may be dried by any sufficient means to produce a swellable glass particle that is easily added to the other components of the carrier fluid. With the benefit of this disclosure, one having ordinary skill in the art should be able to select an appropriate size of swellable glass particle.

The swellable glass particles may be introduced into the subterranean formation using any suitable carrier fluid. The carrier fluid may be any suitable fluid for moving and carrying the swellable glass particles to the desired location in the subterranean formation. After placing the swellable glass particles in the subterranean formation, the carrier fluid may be removed from (or leak off into) the subterranean formation leaving the swellable glass particles deposited in the subterranean formation. The carrier fluid having the swellable glass particles disposed therein may be pumpable.

In specific examples, the carrier fluid may be selected such that is compatible with and will not damage the subterranean formation.

Examples of suitable carrier fluids may include, without limitation, fresh water, deionized water, brine water of varying salinity, chloride solutions such as calcium chloride and potassium chloride solutions, and combinations thereof. To avoid premature swelling, the carrier fluid may be aqueous-based in some examples. Specific examples of the carrier fluid may comprise water and optionally may comprise one or more dissolved salts.

The carrier fluid may be capable of at least temporarily suspending the swellable glass particles. As the swellable glass particles may have a specific gravity different than carrier fluid (e.g., water), the carrier fluid may further comprise a viscosity-increasing agent to help suspend the swellable glass particles. The viscosity-increasing agent used for the carrier fluid may comprise any suitable viscosity-increasing agent. Without limitation, examples of viscosity-increasing agents may include synthetic polymers; polysaccharides (e.g., welan gum); swellable clays such as bentonite; biopolymers such as cellulose derivatives (e.g., hydroxyethyl cellulose, carboxymethyl cellulose, carboxymethyl hydroxyethyl cellulose). An example of a commercially available viscosifier is SA-1015™ Suspending Agent available from Halliburton Energy Services, Inc., Houston, Tex. If a viscosity-increasing agent is included, it can further be helpful for the carrier fluid to additionally include a breaker for the viscosity-increasing agent that is adapted to break the viscosity of the carrier fluid after a period of time at the static temperature of the subterranean formation, whereby the carrier fluid can be used to place the swellable glass particles into the subterranean formation and then after allowing sufficient time for the viscosity of the carrier fluid to be broken by the breaker, the carrier fluid may be removed from (or leak off into) the subterranean formation leaving the swellable glass particles deposited in the subterranean formation.

In specific examples, the carrier fluid for the swellable glass particles may remain sufficiently non-viscous in order to be displaced into the permeable areas of the subterranean formation with minimal pressure. Thus, there may be no need to apply higher pressure that could damage the rock structure of the subterranean formation in an attempt to force the swellable glass particles into the permeable zones.

The swellable glass particles may be incorporated in the carrier fluid in an effective amount for plugging a permeable zone (with the subsequent resin) upon being placed downhole and into the subterranean formation. The effective amount can vary depending on factors such as the type of the carrier fluid, the size of a fracture, fissure, etc., type and amount of resin, and the like. The amount of swellable glass particles that may be combined with the carrier fluid depends on a number of factors including the type of carrier fluid. In general, the carrier fluid may contain, without limitation, from about 0.001 to about 5 pounds of the swellable glass particles per gallon carrier fluid and alternatively from about 0.01 to about 2 pounds of the swellable glass particles per gallon carrier fluid. In specific examples, the swellable glass particles may be present in an amount of about 0.001, about 0.01, about 0.1, about 1, about 2, about 3, about 4, or about 5 pounds of the swellable glass particles per gallon carrier fluid As previously described, the swellable glass particles may be contacted with a resin to induce swelling in the subterranean formation. The resin may also thicken to develop compressive strength and/or to form a seal when placed in the subterranean formation. Accordingly, the resin may function with the swellable glass particles to provide a substantially impermeable barrier to fluid flow in the subterranean formation, for example to prevent loss of fluids from the wellbore into the subterranean formation and/or seal off formation fluids and gases and consequently prevent potential fluid and gas migration into the annulus or the interior of the casing.

The resin may be placed into the subterranean formation in a resin composition that may comprise the resin and an optional diluent. As used herein, the term "resin" refers to any of a number of physically similar polymerized synthetics or chemically modified natural resins including thermoplastic materials and thermosetting materials. Examples of resins that may be used in the resin composition include, but are not limited to, epoxy-based resins, novolac resins, polyepoxide resins, phenol-aldehyde resins, urea-aldehyde resins, urethane resins, phenolic resins, furan/furfuryl alcohol resins, phenolic/latex resins, phenol formaldehyde resins, bisphenol A diglycidyl ether resins, butoxymethyl butyl glycidyl ether resins, bisphenol A-epichlorohydrin resins, bisphenol F resins, glycidyl ether resins, polyester resins and hybrids and copolymers thereof, polyurethane resins and hybrids and copolymers thereof, acrylate resins, and mixtures thereof. Some suitable resins, such as epoxy resins, may be cured with a hardening agent so that when pumped downhole, they may be cured using only time and temperature. Other suitable resins, such as furan resins generally require a time-delayed hardening agent to help activate the polymerization of the resins if the formation temperature is low (i.e., less than 250° F.), but will cure under the effects of time and temperature if the formation temperature is above about 250° F. One resin that may be used in embodiments is the WELLLOCK™ resin system, available from Halliburton Energy Services, Inc., of Houston, Tex.

The selection of a suitable resin may be affected by the temperature of the subterranean formation to which the resin composition will be introduced. By way of example, for subterranean formations having a bottom hole static temperature ("BHST") ranging from about 60° F. to about 250° F., two-component epoxy-based resins comprising a resin component and a hardening agent may be preferred. For subterranean formations having a BHST ranging from about 300° F. to about 600° F., a furan-based resin may be preferred. For subterranean formations having a BHST ranging from about 200° F. to about 400° F., either a phenolic-based resin or a one-component HT epoxy-based resin may be suitable. For subterranean formations having a BHST of at least about 175° F., a phenol/phenol formaldehyde/furfuryl alcohol resin may also be suitable. Those of ordinary skill in the art, with the benefit of this disclosure, should be able to select a resin for a particular application.

Generally, the resin may be included in the resin composition in an amount, without limitation, in the range of about 5% to about 100% by volume of the resin composition. In particular examples, the resin may be included in the resin composition in an amount of about 60% to about 100% by volume of the resin composition. In specific examples, the resin may be present in an amount of about 5%, about 10%, about 20%, about 30%, about 40%, about 50%, about 60%, about 70%, about 80%, about 90%, or about 100% by weight of the resin composition. Factors that may affect this determination include the type of resin and potential hardening agent desired for a particular application. Those of ordinary skill in the art, with the benefit of this disclosure, should be able to select an amount of a resin for a particular application.

The resin composition generally should have a density suitable for a particular application as desired by those of ordinary skill in the art. Without being limited by theory, the density of the resin composition may be adjusted to achieve the proper density hierarchy for placement of the resin. Without limitation, the resin composition may have a density in the range of from about 5 pounds per gallon ("ppg") to about 17 ppg, alternatively, from about 8 ppg to about 14 ppg, or, alternatively, from about 10 ppg to about 12 ppg. Further, filler particles may be chosen which modify the mechanical properties of the set resin composition or the fluid properties of the liquid (uncured) resin composition. Such filler particles may have the same density as the resin composition so that the bulk density is not changed. Examples of suitable filler particles may include, but are not limited to, aluminum oxide, awaruite, barium carbonate, barium oxide, barite, calcium carbonate, calcium oxide, cenospheres, chromite, chromium oxide, copper, copper oxide, dolomite, galena, hematite, hollow glass microspheres, ilmenite, iron oxide, siderite, magnetite, magnesium oxide, manganese carbonate, manganese dioxide, manganese (IV) oxide, manganese oxide, manganese tetraoxide, manganese (II) oxide, manganese (III) oxide, molybdenum (IV) oxide, molybdenum oxide, molybdenum trioxide, Portland cement, pumice, pyrite, spherelite, silica, silver, tenorite, titania, titanium (II) oxide, titanium (III) oxide, titanium (IV) dioxide, zirconium oxide, zirconium silicate, zinc oxide, cement-kiln dust, unexpanded and expanded perlite, attapulgite, bentonite, zeolite, elastomers, sand, micronized polymers, waxes, polymer fibers, inorganic fibers and any combination thereof. It should be noted that the foregoing list encompasses all crystal forms of any material. Those of ordinary skill in the art, with the benefit of this disclosure, should recognize the appropriate density of the resin composition for a particular application.

Optionally, a diluent may be added to the resin composition to reduce the viscosity of the resin composition for ease of handling, mixing, and transferring. However, in some instances, it may be desirable to not use a diluent (e.g., for environmental or safety reasons). Factors that may affect this decision include geographic location of the well, the surrounding weather conditions, and the desired long-term stability of the well bore servicing fluid. Those of ordinary skill in the art, with the benefit of this disclosure, should be able to determine whether to use a diluent for a particular application.

Generally, any diluent that is compatible with the resin and that achieves the desired viscosity effect may be suitable for use in the resin composition. Some diluents may be reactive, in that they are incorporated into the resin. Diluents that are reactive may comprise amine or epoxide functional groups. Suitable diluents may include, but are not limited to, butyl glycidyl ether, cyclohexane dimethanol diglycidyl ether, polyethylene glycol, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene, fatty acid methyl esters, or any combinations thereof. Selection of an appropriate diluent may be dependent on the resin chosen. Without limitation, the amount of the diluent used in the resin composition may be in the range of about 0.1% to about 30% by weight of the resin composition. In specific examples, the diluent may be present in an amount of about 0.1%, about 1%, about 5%, about 10%, about 25%, or about 30% by weight of the resin composition. Optionally, the resin composition may be heated to reduce its viscosity, in place of, or in addition to, using a diluent. Those of ordinary skill in the art, with the benefit of this disclosure, should be able to select a type of and the amount of a diluent for a particular application.

Optionally, the resin composition may further comprise a hardening agent. As used herein, "hardening agent" refers to any substance capable of transforming the resin into a hardened, consolidated mass, for example, by way of cross-linking the resin. Examples of suitable hardening agents include, but are not limited to, aliphatic amines, aliphatic tertiary amines, aromatic amines, cycloaliphatic amines, heterocyclic amines, amido amines, polyamides, polyethyl amines, polyether amines, polyoxyalkylene amines, carboxylic anhydrides, triethylenetetraamine, ethylene diamine, N-cocoalkyltrimethylene, isophorone diamine, N-aminophenyl piperazine, imidazoline, 1,2-diaminocyclohexane, polytheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, and combinations thereof. Commercial examples of hardening agents may include, but are not limited to, ETHACURE® 100 curative, available from Albemarle Corp. of Baton Rouge, La., and JEFFAMINE® D-230 polyetheramine, available from Huntsman Corp. of The Woodlands, Tex. The hardening agent may be included in the resin composition in an amount sufficient to at least partially harden the resin composition. Without limitation, the hardening agent may be included in the resin composition in the range of about 5% to about 50% by volume of the resin composition and, alternatively, from about 20% to about 50%. In specific examples, the hardening agent may be present in an amount of about 5%, about 10%, about 20%, about 30%, about 40%, or about 50% by volume of the resin composition. Those of ordinary skill in the art, with the benefit of this disclosure, should be able to select a type of hardening agent and amount of hardening agent for a particular application.

The amount of hardening agent may be selected to impart a desired elasticity or compressibility. Without limitation, generally, the lower the amounts of hardening agent present in the resin composition, the greater the elasticity or compressibility will be. With the benefit of this disclosure, those of ordinary skill in the art should be able to select an appropriate amount of hardening agent to achieve a desired elasticity or compressibility for a particular application.

Mixtures of hardening agents may be used in some examples to impart particular qualities to the resin composition. For example, the hardening agent may comprise a fast-setting hardening agent and a slow-setting hardening agent. As used herein, "fast-setting hardening agent" and "slow-setting hardening agent" do not imply any specific rate at which the agents set a resin; instead, the terms merely indicate the relative rates at which the hardening agents initiate hardening of the resin. Whether a particular hardening agent is considered fast-setting or slow-setting may depend on the other hardening agent(s) with which it is used. In a particular examples, ETHACURE® 100 may be used as a slow-setting hardening agent, and JEFFAMINE® D-230 may be used as a fast-setting hardening agent. In specific examples, the ratio of fast-setting hardening agent to slow-setting hardening agent may be selected to achieve a desired behavior of the hardening agent. For example, the fast-setting hardening agent may be included in a ratio of approximately 1:5, by volume, with the slow-setting hardening agent. Those of ordinary skill in the art, with the benefit of this disclosure, should be able to select a mixture of hardening agents for a particular application.

The hardening agent may also comprise an optional silane coupling agent. The silane coupling agent may be used, among other things, to act as a mediator to help bond the resin to the surface of the subterranean formation and/or the surface of the well bore. Examples of suitable silane coupling agents include, but are not limited to, N-2-(aminoethyl)-3-aminopropyltrimethoxysilane; 3-glycidoxypropyltrimethoxysilane; gamma-aminopropyltriethoxysilane; N-beta-(aminoethyl)-gamma-aminopropyltrimethoxysilanes; aminoethyl-N-beta-(aminoethyl)-gamma-aminopropyltrimethoxysilanes; gamma-ureidopropyl-triethoxysilanes; beta-(3-4 epoxy-cyclohexyl)-ethyl-trimethoxysilane; gamma-glycidoxypropyltrimethoxysilanes; vinyltrichlorosilane; vinyltris (beta-methoxyethoxy) silane; vinyltriethoxysilane; vinyltrimethoxysilane; 3-metacryloxypropyltrimethoxysilane; beta-(3,4 epoxycyclohexyl)-ethyltrimethoxysilane; r-glycidoxypropyltrimethoxysilane; r-glycidoxypropylmethylidiethoxysilane; N-beta-(aminoethyl)-r-aminopropyltrimethoxysilane; N-beta-(aminoethyl)-r-aminopropylmethyldimethoxysilane; 3-aminopropyl-triethoxysilane; N-phenyl-r-aminopropyltrimethoxysilane; r-mercaptopropyltrimethoxysilane; r-chloropropyltrimethoxysilane; vinyltrichlorosilane; vinyltris (beta-methoxyethoxy) silane; vinyltrimethoxysilane; r-metacryloxypropyltrimethoxysilane; beta-(3,4 epoxycyclohexyl)-ethyltrimethoxysila; r-glycidoxypropyltrimethoxysilane; r-glycidoxypropylmethylidiethoxysilane; N-beta-(aminoethyl)-r-aminopropyltrimethoxysilane; N-beta-(aminoethyl)-r-aminopropylmethyldimethoxysilane; r-aminopropyltriethoxysilane; N-phenyl-r-aminopropyltrimethoxysilane; r-mercaptopropyltrimethoxysilane; r-chloropropyltrimethoxysilane; N[3-(trimethoxysilyl)propyl]-ethylenediamine; substituted silanes where one or more of the substitutions contains a different functional group; or any combinations thereof. Generally, the silane coupling agent may be included in the hardening agent in an amount capable to sufficiently bond the resin. Without limitation, the silane coupling agent may be included in the hardening agent in the range of about 0.1% to about 95% by volume of the hardening agent. In specific examples, the silane coupling agent may be present in an amount of about 5%, about 10%, about 20%, about 30%, about 40%, about 50%, about 60%, about 70%, about 80%, about 90%, or about 95% by volume of the hardening agent. Those of ordinary skill in the art, with the benefit of this disclosure, should be able to select a silane coupling agent for a particular application.

As will be appreciated by those of ordinary skill, the resin composition may be prepared in accordance with any suitable technique. For example, the desired quantity of resin may be introduced into a mixer (e.g., a batch mixer) prior to or followed by the addition of any optional hardening agent and/or diluent. Additional additives, if any, may be added to the mixer as desired prior to, or after, the addition of the resin to the mixer. This mixture may be agitated for a sufficient period of time. By way of example, pumps may be used for delivery of the resin composition into the wellbore. As will be appreciated by those of ordinary skill in the art, with the benefit of this disclosure, other suitable techniques for preparing the resin composition may be used in accordance with embodiments.

A well treatment method may be provided. The method may include one or all of the components as disclosed herein. The method may include one or all of the components and/or steps illustrated in FIGS. 1-3. The method may include introducing swellable glass particles into a zone of a subterranean formation. The method may include contacting the swellable glass particles with a resin composition in the zone. The method may include allowing the resin composition to harden in the zone whereby flow through the zone is reduced. The method may further comprise pumping a carrier fluid comprising the swellable glass particles through a well conduit and into the zone. The method may further comprise pumping the resin composition through a well conduit and into the zone to contact the swellable glass particles. At least a portion of the swellable glass particles may swell upon contact with the resin composition to seal openings in the zone. The portion of the swellable glass particles may swell to a volume of about 1.5 times or greater of a dry volume of the swellable glass particles. The swellable glass particles may each comprise a plurality of interconnected organosilica nanoparticles. The swellable glass particles may each comprise a bridged organosiloxane sol-gel comprising a plurality of alkylsiloxy substituents. The swellable glass particles may be introduced into the subterranean formation in a carrier fluid, wherein the carrier fluid is aqueous based and comprises the swellable glass particles in an amount of about 0.001 to about 5 pounds per gallon of the carrier fluid. The resin composition may comprise a resin and a hardening agent. The resin may comprise at least one resin selected from the group consisting of an epoxy-based resin, novolac resin, polyepoxide resin, phenol-aldehyde resin, urea-aldehyde resin, urethane resin, phenolic resin, furan/furfuryl alcohol resin, phenolic/latex resin, phenol formaldehyde resin, bisphenol A diglycidyl ether resin, butoxymethyl butyl glycidyl ether resin, bisphenol A-epichlorohydrin resin, bisphenol F resin, glycidyl ether resin, polyester resin and hybrids and copolymers thereof, polyurethane resin and hybrids and copolymers thereof, acrylate resin, and combinations thereof. The hardening agent may comprise at least one hardening agent selected from group consisting of an aliphatic amine, aliphatic tertiary amine, aromatic amine, cycloaliphatic amine, heterocyclic amine, amido amine, polyamides, polyethyl amine, polyether amine, polyoxyalkylene amine, carboxylic anhydrides, triethylenetetraamine, ethylene diamine, N-cocoalkyltrimethylene, isophorone diamine, N-aminophenyl piperazine, imidazoline, 1,2-diaminocyclohexane, polytheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, and combinations thereof. The resin composition further may comprise a diluent selected from the group consisting of butyl glycidyl ether, cyclohexane dimethanol diglycidyl ether, polyethylene glycol, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene, fatty acid methyl esters, or any combinations thereof. The method may further comprise identifying a lost circulation zone, wherein the lost circulation zone is the zone.

A lost circulation composition may be provided. The lost circulation composition may include one or all of the components illustrated in FIGS. 1-3. The lost circulation composition may comprise a resin composition and swellable glass particles. The swellable glass particles may be dispersed in the resin composition. At least a portion of the swellable glass particles may be swollen to a volume of about 1.5 times or greater of a dry volume of the swellable glass particles. The resin composition may be set to form a hardened mass. The swellable glass particles may each comprise a plurality of interconnected organosilica nanoparticles. The swellable glass particles may each comprise a bridged organosiloxane sol-gel comprising a plurality of alkylsiloxy substituents. The resin composition may comprise a resin and a hardening agent. The resin may comprise at least one resin selected from the group consisting of an epoxy-based resin, novolac resin, polyepoxide resin, phenol-aldehyde resin, urea-aldehyde resin, urethane resin, phenolic resin, furan/furfuryl alcohol resin, phenolic/latex resin, phenol formaldehyde resin, bisphenol A diglycidyl ether resin, butoxymethyl butyl glycidyl ether resin, bisphenol A-epichlorohydrin resin, bisphenol F resin, glycidyl ether resin, polyester resin and hybrids and copolymers thereof, polyurethane resin and hybrids and copolymers thereof, acrylate resin, and combinations thereof. The hardening agent may comprise at least one hardening agent selected from group consisting of an aliphatic amine, aliphatic tertiary amine, aromatic amine, cycloaliphatic amine, heterocyclic amine, amido amine, polyamides, polyethyl amine, polyether amine, polyoxyalkylene amine, carboxylic anhydrides, triethylenetetraamine, ethylene diamine, N-cocoalkyltrimethylene, isophorone diamine, N-aminophenyl piperazine, imidazoline, 1,2-diaminocyclohexane, polytheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, and combinations thereof. The resin composition further may comprise a diluent selected from the group consisting of butyl glycidyl ether, cyclohexane dimethanol diglycidyl ether, polyethylene glycol, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene, fatty acid methyl esters, or any combinations thereof.

A well system may be provided. The well system may include one or all of the components as disclosed herein. The well system may include one or all of the components and/or steps illustrated in FIGS. 1-3. The well system may comprise a fluid supply comprising: a carrier fluid comprising swellable glass particles; and a resin composition, wherein the swellable glass particles are not in contact with the resin composition in the fluid supply. The well system may further comprise pumping equipment for delivering the carrier fluid and/or the resin composition into a wellbore. The carrier fluid and the resin composition may be contained in separate containers. The well system may further comprise a well supply conduit in fluid communication with a wellbore. At least a portion of the swellable glass particles may swell upon contact with the resin composition to seal openings in the zone. The portion of the swellable glass particles may swell to a volume of about 1.5 times or greater of a dry volume of the swellable glass particles. The swellable glass particles may each comprise a plurality of interconnected organosilica nanoparticles. The swellable glass particles may each comprise a bridged organosiloxane sol-gel comprising a plurality of alkylsiloxy substituents. The carrier fluid may be aqueous based and comprise the swellable glass particles in an amount of about 0.001 to about 5 pounds per gallon of the carrier fluid. The resin composition may comprise a resin and a hardening agent. The resin may comprise at least one resin selected from the group consisting of an epoxy-based resin, novolac resin, polyepoxide resin, phenol-aldehyde resin, urea-aldehyde resin, urethane resin, phenolic resin, furan/furfuryl alcohol resin, phenolic/ latex resin, phenol formaldehyde resin, bisphenol A diglycidyl ether resin, butoxymethyl butyl glycidyl ether resin, bisphenol A-epichlorohydrin resin, bisphenol F resin, glycidyl ether resin, polyester resin and hybrids and copolymers thereof, polyurethane resin and hybrids and copolymers thereof, acrylate resin, and combinations thereof. The hardening agent may comprise at least one hardening agent selected from group consisting of an aliphatic amine, aliphatic tertiary amine, aromatic amine, cycloaliphatic amine, heterocyclic amine, amido amine, polyamides, polyethyl amine, polyether amine, polyoxyalkylene amine, carboxylic anhydrides, triethylenetetraamine, ethylene diamine, N-cocoalkyltrimethylene, isophorone diamine, N-aminophenyl piperazine, imidazoline, 1,2-diaminocyclohexane, polytheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, and combinations thereof. The resin composition further may comprise a diluent selected from the group consisting of butyl glycidyl ether, cyclohexane dimethanol diglycidyl ether, polyethylene glycol, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene, fatty acid methyl esters, or any combinations thereof.

Example methods of using the swellable glass particles for reducing flow in a subterranean formation will now be described in more detail with reference to FIGS. 1-3. Any of the previous embodiments of the swellable glass particles and/or the resin composition may apply in the context of FIGS. 1-3. Referring now to FIG. 1, a fluid handling system 10 is illustrated. The fluid handling system 10 may be used for preparing the carrier fluid comprising the swellable glass particles disposed herein and introduction of the carrier fluid into a wellbore. Alternatively, the fluid handling system 10 may be used for preparing a resin composition comprising a resin, an optional diluent, and an optional hardening agent and introducing of the resin composition into a wellbore. The fluid handling system 10 may include mobile vehicles, immobile installations, skids, hoses, tubes, fluid tanks or reservoirs, pumps, valves, and/or other suitable structures and equipment. For example, the fluid handling system 10 may include a fluid supply 15 and pumping equipment 20, which both may be fluidically coupled with a wellbore supply conduit 25. The fluid supply 15 may contain the carrier fluid or the resin composition. The pumping equipment 20 may be used to supply the carrier fluid or the resin composition from the fluid supply 15, which may include tank, reservoir, connections to external fluid supplies, and/or other suitable structures and equipment. While not illustrated, the fluid supply 15 may contain the carrier fluid and the swellable glass particles (or one or more components of the resin composition) in separate tanks or other containers that may be mixed at any desired time. Pumping equipment 20 may be fluidically coupled with the wellbore supply conduit 25 to communicate the carrier fluid and/or the resin composition into the wellbore. Fluid handling system 10 may also include surface and downhole sensors (not shown) to measure pressure, rate, temperature and/or other parameters of treatment. Fluid handling system 2 may include pump controls and/or other types of controls for starting, stopping and/or otherwise controlling pumping as well as controls for selecting and/or otherwise controlling fluids pumped during the injection treatment. An injection control system may communicate with such equipment to monitor and control the injection treatment. Fluid handling system 10 can be configured as shown in FIG. 1 or in a different manner, and may include additional or different features as appropriate. Fluid handling system 10 may be deployed via skid equipment, marine vessel deployed or may be comprised of sub-sea deployed equipment.

Figure 2:
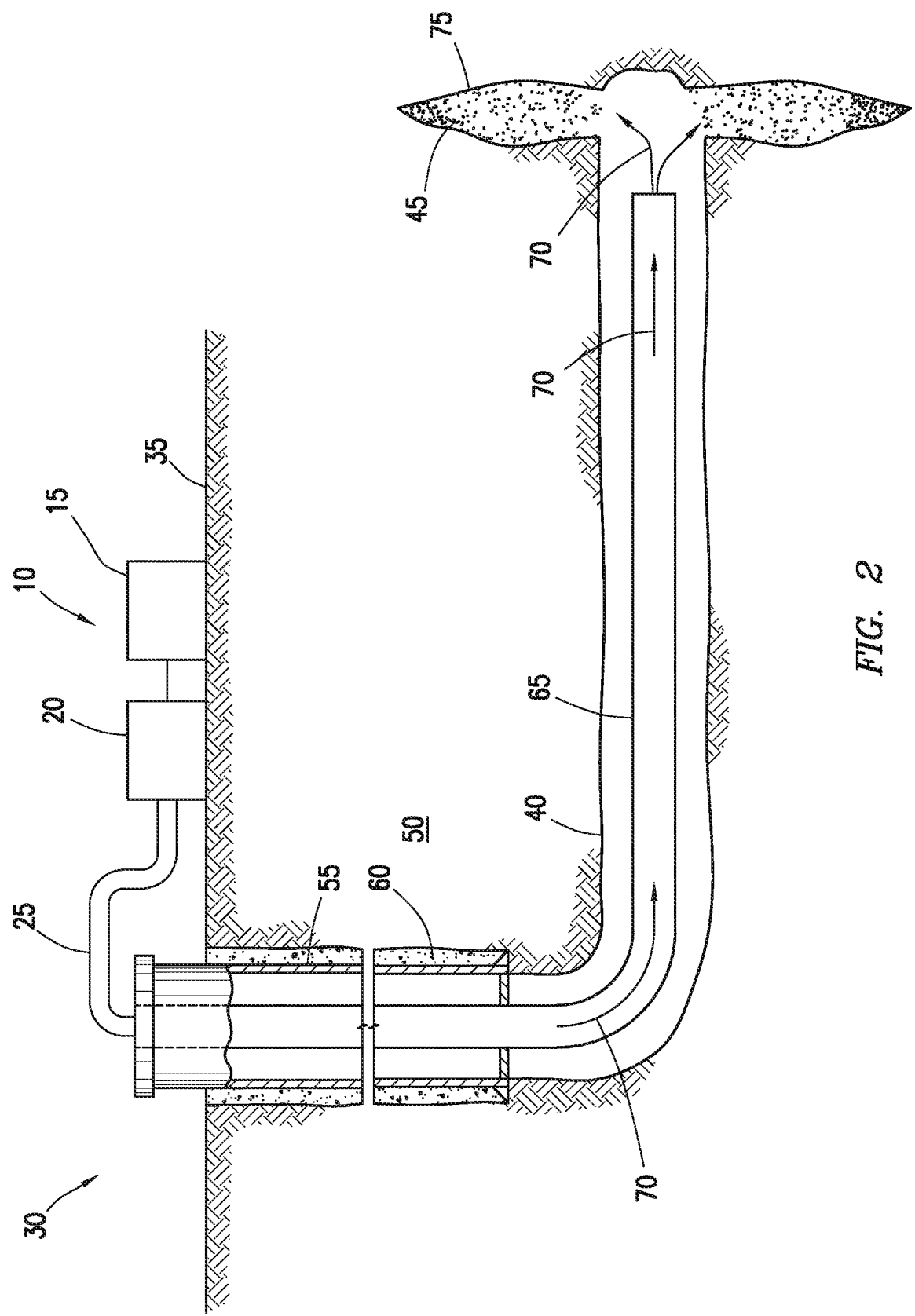
FIGS. 2 and 3 are schematic illustrations of an example well system.

Turning now to FIG. 2, an example well system 30 is shown. As illustrated, the well system 30 may include a fluid handling system 10, which may include fluid supply 15, pumping equipment 20 and wellbore supply conduit 25. As previously described in connection with FIG. 1, pumping equipment 20 may be fluidically coupled with the wellbore supply conduit 25 to communicate the carrier fluid into wellbore 40. As depicted in FIG. 2, the fluid supply 15 and pumping equipment 20 may be above the surface 35 while wellbore 40 is below the surface. Well system 30 can be configured as shown in FIG. 2 or in a different manner, and may include additional or different features as appropriate.

As illustrated in FIG. 2, the well system 30 may be used for introduction of swellable glass particles 45, described herein, into subterranean formation 50 surrounding wellbore 40. Generally, wellbore 40 may include horizontal, vertical, slanted, curved, and other types of wellbore geometries and orientations, and the swellable glass particles 45 may generally be applied to subterranean formation 50 surrounding any portion of wellbore 14. As illustrated, wellbore 40 may include a casing 55 (e.g., surface casing) that may be cemented (or otherwise secured) to wellbore wall by cement sheath 60. A well conduit 65 such as a coiled tubing, production tubing, or other suitable conduit may be disposed in the interior of the casing 55 in wellbore 40. The well conduit 65 may be the same or different than the wellbore supply conduit 25. For example, the well conduit 65 may be an extension of the wellbore supply conduit 25 into wellbore 40 or may be tubing or other conduit that is coupled to the wellbore supply conduit 25.

A carrier fluid comprising the swellable glass particles 45 may be pumped from fluid supply 15 down the interior of well conduit 65 in wellbore 40. The carrier fluid may be allowed to flow down the interior of well conduit 65, exit the well conduit 65, and finally enter subterranean formation 50 surrounding wellbore 40, as illustrated on FIG. 2 by arrows 70. As illustrated, the carrier fluid comprising the swellable glass particles 45 may be introduced into zone 75 of the subterranean formation 50. Zone 75 may be any portion of the subterranean formation 50 containing flow paths through which fluid may undesirably flow. By way of example, zone 75 may include, without limitation, fissures, cracks, fractures, streaks, flow channels, voids, high permeable streaks, annular voids, or combinations thereof, as well as any other zone in the subterranean formation 50 through which fluids may undesirably flow. The carrier fluid may leak off into the subterranean formation 50 or be recovered to the surface 35, depositing the swellable glass particles 45 in zone 75 of the subterranean formation 50.

Figure 3:
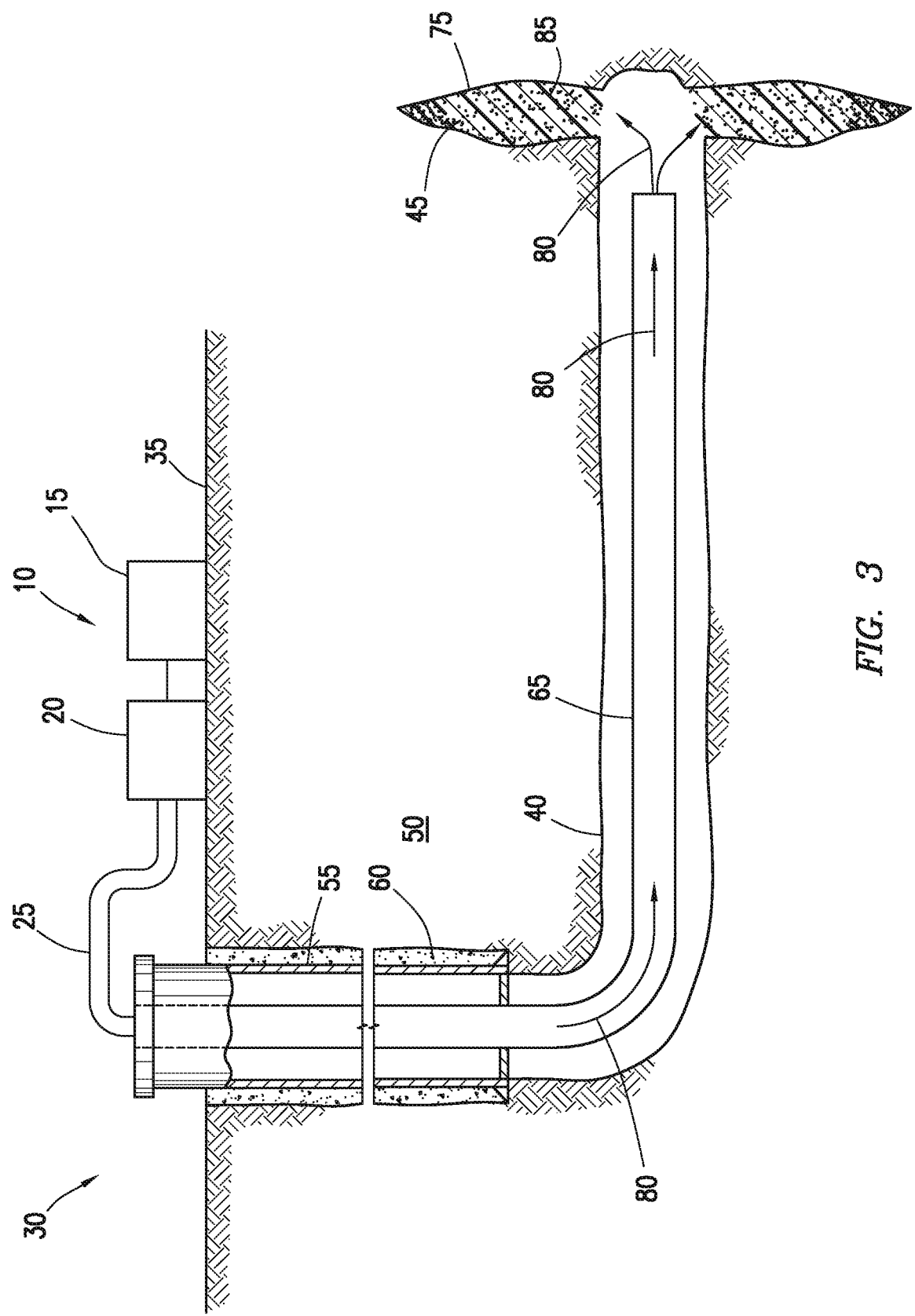

Referring now to FIG. 3, a resin composition may then be pumped from fluid supply 15 down the interior of well conduit 65 in wellbore 40. The resin composition may be allowed to flow down the interior of well conduit 65 exit the well conduit 65, and finally enter subterranean formation 50 surrounding wellbore 40, as illustrated on FIG. 3 by arrows 80. As illustrated, the resin composition may be introduced into zone 75 of the subterranean formation 50 in which the swellable glass particles 45 have been placed. The resin composition may contact the swellable glass particles 45, causing the swellable glass particles 45 to swell. In the zone 45, the resin composition may set to form a hardened mass, illustrated on FIG. 3 as set resin 85. The set resin 85 together with the swellable particles 45 may reduce flow of fluids in zone 75 of the subterranean formation 50, thus restricting and potentially preventing the flow of fluids into wellbore 40 through zone 75. The set resin 85 together with the swellable particles 45 may also restrict and potentially prevent the flow of fluids from wellbore 40 into zone 75, thus alleviating potential problems with loss of fluid circulation in wellbore 40. As drilling or other operations in wellbore 40 may have been ceased for introduction of the resin composition and swellable glass particles 45 into zone 75, for example, to control lost circulation, such drilling or other operations may be resumed with the set resin 85 and swellable glass particles 45 placed into zone 75.

The exemplary swellable glass particles and/or resins disclosed herein may directly or indirectly affect one or more components or pieces of equipment associated with the preparation, delivery, recapture, recycling, reuse, and/or disposal of the disclosed swellable glass particles and resins compositions. For example, the swellable glass particles and/or resins may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary swellable glass particles and/or resins. The disclosed swellable glass particles and/or resins may also directly or indirectly affect any transport or delivery equipment used to convey the swellable glass particles and/or resins to a well site or downhole such as, for example, any transport vessels, conduits, pipelines, trucks, tubulars, and/or pipes used to compositionally move the swellable glass particles and/or resins from one location to another, any pumps, compressors, or motors (e.g., topside or downhole) used to drive the swellable glass particles and/or resins compositions into motion, any valves or related joints used to regulate the pressure or flow rate of the swellable glass particles and/or resins, and any sensors (i.e., pressure and temperature), gauges, and/or combinations thereof, and the like. The disclosed swellable glass particles and/or resins may also directly or indirectly affect the various downhole equipment and tools that may come into contact with the swellable glass particles and/or resins such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

To facilitate a better understanding of the present embodiments, the following examples of certain aspects of some embodiments are given. In no way should the following examples be read to limit, or define, the entire scope of the embodiments.

Examples

The following example was performed to demonstrate the ability of swellable glass particles together with a resin composition to reduce fluid flow. For this example, swellable glass particles having an average particle size (D50) of 330 microns were obtained from ABSMaterials, Inc. of Wooster, Ohio, under the trade name OSORB® swellable glass. An aqueous slurry was prepared comprising:

TABLE 1

| Slurry Composition | |
| --- | --- |
| Component | Amount (grams) |
| Swellable Glass Particles | 26.6 |
| Bentonite | 2 |
| Water | 100 |

This aqueous slurry was poured into a static fluid loss cell with a 325-mesh screen, and a differential pressure of 1,000 pounds per square inch was applied. All of the fluid drained from the fluid loss cell in 8 minutes and 47 seconds. A filter cake containing the swellable glass particles was retained on the mesh screen. This aqueous slurry had poor fluid loss control because the swellable glass particles did not seal off the fluid flow.

Next, the pressure was slowly released on the fluid loss cell, and the top of the cell was opened to reveal the filter cake of swellable glass particles. Next, a resin composition was added slowly to the fluid loss cell so as not to disturb the filer cake. The resin composition comprised:

TABLE 2

| Resin Composition | |
| --- | --- |
| Component | Amount (grams) |
| Epoxy Resin | 56.5 |
| Cyclohexanedimethanol Diglycidyl Ether | 18.8 |
| Diethyltoluenediamine | 21.8 |
| 2,4,6 tris-dimethylaminophenol | 2.8 |

The epoxy resin was ARALDITE® 506 epoxy resin from Sigma-Aldrich Corp., St. Louis, Mo. After addition of the resin composition, the fluid loss cell was sealed, and a differential pressure of 1,000 pounds per square inch was applied. The resin composition began to slowly flow from the bottom of the fluid loss cell as it permeated through the filter cake of swellable glass particles. The rate of flow slowed dramatically and ceased 2 minutes and 35 seconds after pressurizing the cell. It is believed that this was the time needed for the swellable glass particles to swell upon exposure to the resin composition. The fluid loss cell then held the 1,000 pounds per square inch differential pressure for the remaining 27 minutes and 25 seconds (30 minute total test time) with no additional fluid draining from the cell during that time. It is believed that the unique performance in this fluid loss test can be attributed to the swelling of the glass particles with the resin composition, as the swellable glass particles swell in a confined space to seal off any voids or channels for fluid flow.

After 30 minutes, the test was stopped, and the pressure on the fluid loss cell was slowly relieved. Upon examination of the fluid loss cell, it was observed that the swellable glass particles had swollen to seal nearly all of the interior of the fluid loss cell. No liquid resin composition remained on top of the filter cake, indicating that the setting of the resin composition was not impeded by the swellable glass particles. The resin composition set to form a hard, resilient barrier.

The same test was repeated except that the swellable glass particles were left out of the slurry composition of Table 1. In this test, the entire volume of the resin composition (125 mL), flowed through the fluid loss cell in 3 minutes. In comparison, the resin composition only had 8 mL of fluid loss over 30 minutes when used with the swellable glass particles. This indicates that the swellable glass particles retained the resin composition preventing it from flowing through the fluid loss cell.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the example embodiments are well adapted to attain the ends and advantages mentioned as well as those that are inherent therein. The particular embodiments disclosed above are illustrative only, as the disclosed embodiments may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A well treatment method comprising:
   introducing swellable glass particles into a zone of a subterranean formation;
   after introducing the swellable glass particles into the zone, separately introducing a resin composition into the zone;
   contacting the swellable glass particles with the resin composition in the zone;
   forming a filter cake, in the zone, with the swellable glass particles and the resin composition; and
   allowing the resin composition to harden in the zone whereby flow through the zone is reduced.

2. The method of claim 1, wherein the introducing the swellable glass particles into the zone further comprises pumping a carrier fluid comprising the swellable glass particles through a well conduit and into the zone.

3. The method of claim 2, wherein the introducing the resin composition into the zone further comprises pumping the resin composition through the well conduit and into the zone to contact the swellable glass particles.

4. The method of claim 1, wherein at least a portion of the swellable glass particles swell upon contact with the resin composition to seal openings in the zone.

5. The method of claim 4, wherein the portion of the swellable glass particles swell to a volume of about 1.5 times to about 10 times of a dry volume of the swellable glass particles.

6. The method of claim 1, wherein the swellable glass particles each comprise a plurality of interconnected organosilica nanoparticles.

7. The method of claim 1, wherein the swellable glass particles each comprise a bridged organosiloxane sol-gel comprising a plurality of alkylsiloxy substituents.

8. The method of claim 1, wherein the swellable glass particles are introduced into the subterranean formation in carrier fluid, wherein the carrier fluid is aqueous based and comprises the swellable glass particles in an amount of about 0.001 to about 5 pounds per gallon of the carrier fluid.

9. The method of claim 1, wherein the resin composition comprises a resin and a hardening agent.

10. The method of claim 9, wherein the resin comprises at least one resin selected from the group consisting of an epoxy-based resin, novolac resin, polyepoxide resin, phenol-aldehyde resin, urea-aldehyde resin, urethane resin, phenolic resin, furan/furfuryl alcohol resin, phenolic/latex resin, phenol formaldehyde resin, bisphenol A diglycidyl ether resin, butoxymethyl butyl glycidyl ether resin, bisphenol A-epichlorohydrin resin, bisphenol F resin, glycidyl ether resin, polyester resin and hybrids and copolymers thereof, polyurethane resin and hybrids and copolymers thereof, acrylate resin, and combinations thereof, and wherein the hardening agent comprise at least one hardening agent selected from group consisting of an aliphatic amine, aliphatic tertiary amine, aromatic amine, cycloaliphatic amine, heterocyclic amine, amido amine, polyamides, polyethyl amine, polyether amine, polyoxyalkylene amine, carboxylic anhydrides, triethylenetetraamine, ethylene diamine, N-cocoalkyltrimethylene, isophorone diamine, Naminophenyl piperazine, imidazoline, 1,2-diaminocyclohexane, polytheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, and combinations thereof.

11. The method of claim 9, wherein the resin composition further comprises a diluent selected from the group consisting of butyl glycidyl ether, cyclohexane dimethanol diglycidyl ether, polyethylene glycol, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, dTimonene, fatty acid methyl esters, or any combinations thereof.

12. The method of claim 1, further comprising identifying a lost circulation zone, wherein the lost circulation zone is the zone.

13. A well system comprising:
- a fluid supply comprising:
  - a carrier fluid comprising swellable glass particles; and
  - a resin composition, wherein the swellable glass particles are not in contact with the resin composition in the fluid supply;
- pumping equipment for delivering the carrier fluid and/or the resin composition into a wellbore; and
- a filter cake disposed within the wellbore, the filter cake comprising the swellable glass particles and the resin composition, wherein the swellable glass particles are introduced into a zone of a subterranean formation surrounding the wellbore, and, after the swellable glass particles are introduced into the zone, the resin composition is separately introduced into the zone, thereby contacting the swellable glass particles with the resin composition and forming the filter cake in the zone.

14. The well system of claim 13, wherein the carrier fluid and the resin composition are contained in separate containers.

15. The well system of claim 13, further comprising a well supply conduit in fluid communication with the wellbore.

16. The well system of claim 13, wherein the swellable glass particles each comprise a plurality of interconnected organosilica nanoparticles.

17. The well system of claim 13, wherein the carrier fluid is aqueous based and comprises the swellable glass particles in an amount of about 0.001 to about 5 pounds per gallon of the carrier fluid.

18. The well system of claim 13, wherein the resin composition comprises a resin and a hardening agent.

19. The well system of claim 18, wherein the resin comprises at least one resin selected from the group consisting of an epoxy-based resin, novolac resin, polyepoxide resin, phenolaldehyde resin, urea-aldehyde resin, urethane resin, phenolic resin, furan/furfuryl alcohol resin, phenolic/latex resin, phenol formaldehyde resin, bisphenol A diglycidyl ether resin, butoxymethyl butyl glycidyl ether resin, bisphenol A-epichlorohydrin resin, bisphenol F resin, glycidyl ether resin, polyester resin and hybrids and copolymers thereof, polyurethane resin and hybrids and copolymers thereof, acrylate resin, and combinations thereof, and wherein the hardening agent comprise at least one hardening agent selected from group consisting of an aliphatic amine, aliphatic tertiary amine, aromatic amine, cycloaliphatic amine, heterocyclic amine, amido amine, polyamides, polyethyl amine, polyether amine, polyoxyalkylene amine, carboxylic anhydrides, triethylenetetraamine, ethylene diamine, N-cocoalkyltrimethylene, isophorone diamine, Naminophenyl piperazine, imidazoline, 1,2-diaminocyclohexane, polytheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, and combinations thereof.

20. The well system of claim 18, wherein the resin composition further comprises a diluent selected from the group consisting of butyl glycidyl ether, cyclohexane dimethanol diglycidyl ether, polyethylene glycol, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene, fatty acid methyl esters, or any combinations thereof.

* * * * *